Oct. 9, 1923.
H. B. BURT
APPARATUS FOR MAKING FROZEN CONFECTIONS
Filed Jan. 31, 1922
1,470,525
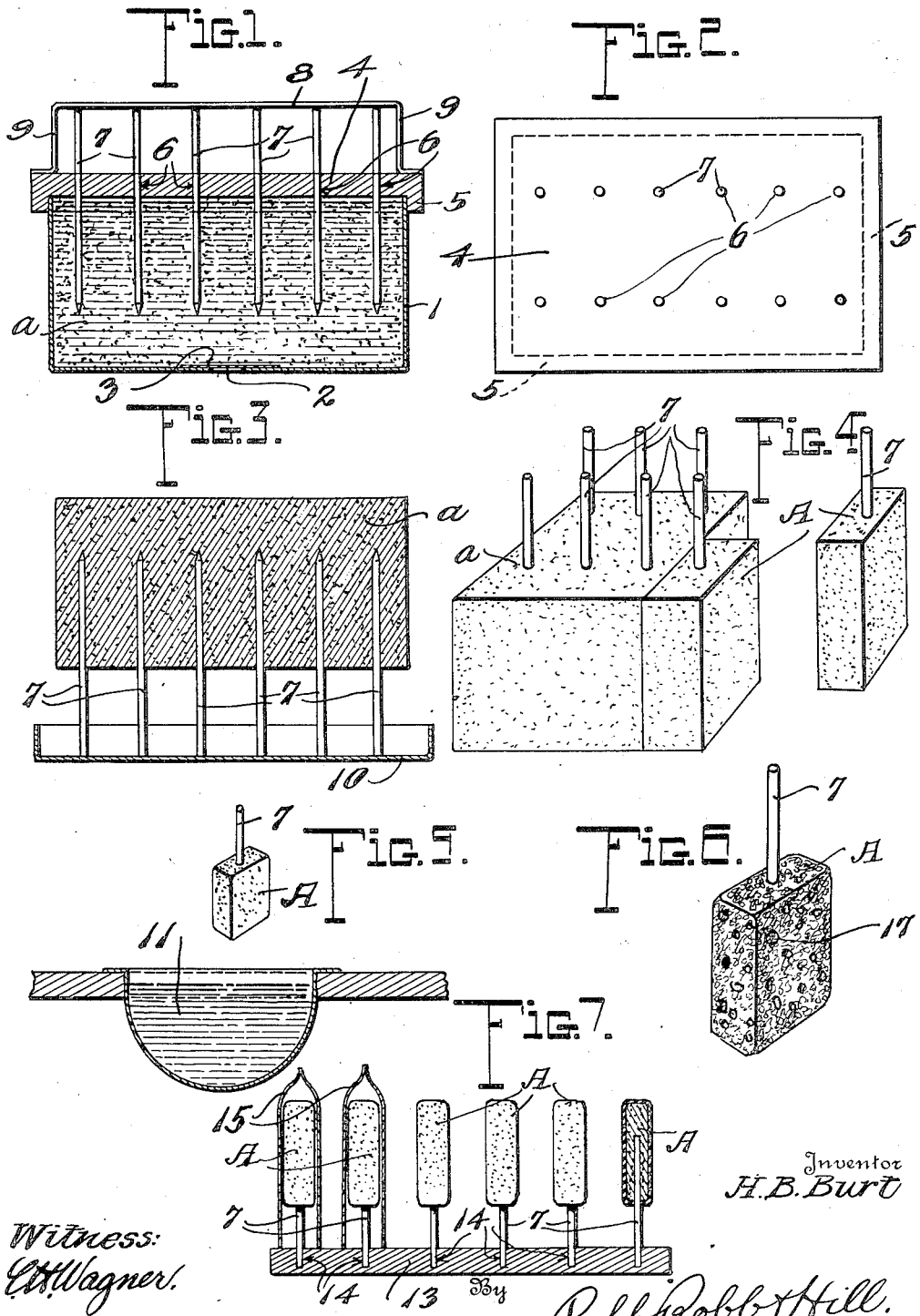

Patented Oct. 9, 1923.

1,470,525

UNITED STATES PATENT OFFICE.

HARRY B. BURT, OF YOUNGSTOWN, OHIO.

APPARATUS FOR MAKING FROZEN CONFECTIONS.

Application filed January 31, 1922. Serial No. 533,082.

*To all whom it may concern:*

Be it known that I, HARRY B. BURT, a citizen of the United States, residing at Youngstown, in the county of Mahoning and State of Ohio, have invented certain new and useful Improvements in Apparatus for Making Frozen Confections, of which the following is a specification.

The present invention relates to an apparatus for use in the manufacture of confections of that general character which have a body portion or heart formed of a frozen substance which is soft or fluid at normal temperatures, and which are provided with a permanently attached handle member by means of which they can be easily manipulated and handled without any need for touching the edible portion of the confections with the fingers.

Among the objects of the invention is to provide an apparatus of this character which is simple and inexpensive in its construction and by means of which the confections can be produced in large numbers or quantities in a comparatively short period of time and with a minimum amount of labor.

The invention further contemplates a device which can be successfully operated by unskilled labor and which is so positive and dependable in its operation as to practically eliminate all waste and produce a practically one hundred per cent perfect output.

A further important feature of the invention is the elimination of any need or occasion to touch the edible portion of the confection with the fingers. From start to finish the edible body of the confection is never touched by the hand and the manufacture is carried on in a strictly sanitary and hygienic manner without any uncleanliness or any possibility of the product becoming infected by reason of being touched with dirty hands.

With the above and other objects in view the invention consists in certain combinations, arrangements and associations of parts, as will more fully appear as the description proceeds, the novel features being pointed out in the appended claims.

For a full understanding of the invention, reference is to be had to the following description and accompanying drawing in which:

Figure 1 is a vertical sectional view through a refrigerating container having a handle positioning and holding member thereon, and also showing a gauge for causing all of the handles to project a uniform distance into the container.

Figure 2 is a top plan view thereof.

Figure 3 is a side elevation of a block of the frozen edible substance which has been removed from the refrigerating container and is temporarily supported upon the projecting ends of the handles.

Figure 4 is a perspective view of a portion of a block of the frozen edible substance which has been partially cut up into individual portions, each of which is provided with one of the handles.

Figure 5 is a detail view illustrating in a diagrammatic manner the possible dipping of the individual portions.

Figure 6 is a perspective view of one of the individual confections which is provided with an outer protective coating formed of comparatively hard, edible granules.

Figure 7 is a detail view of the drying rack upon which the individual confections are placed after the protective coating has been applied thereto.

Corresponding and like parts are referred to in the following description and indicated in all of the views of the drawings by like reference characters.

Specifically describing the embodiment of the invention which is illustrated by the drawings, the numeral 1 designates a refrigerating container which is preferably of the standard construction or type used by ice cream manufacturers for receiving the soft and partially frozen ice cream from the freezer and holding it during the hardening process. These containers are ordinarily formed of sheet metal and after being filled with the partially frozen and soft ice cream are placed in a refrigerating chamber and maintained at a low temperature, usually about five degrees below zero, for a period of several hours or until the ice cream has hardened in the desired manner, after which it is ejected from the receptacle in the form of a brick or block. For the purposes of this invention this receptacle 1 is preferably provided in the bottom thereof with an air inlet opening 2 to facilitate the removal of the receptacle from the finally hardened block of ice cream, and this opening may be covered with a sheet 3 of waxed paper or the like to prevent the escape of the partially frozen ice cream when the container is initially filled from the freezer.

A cover 4 is intended to be applied to the receptacle 1 and this cover is preferably provided with some means such as a flange 5 for enabling it to be accurately positioned upon the receptacle. A series of openings 6 are formed in the cover 4, said openings being preferably arranged in rows and uniformly spaced the exact spacing depending upon the size of the individual confections into which the finally hardened block of ice cream is to be cut, as will be hereinafter more fully set forth. The handle members 7 are in the form of small sticks or rods and may be formed of wood, candy, or any other suitable material. These handle members are inserted in the openings 6 of the cover 4, either before or after the cover has been applied to the container 1. The lower ends of the handle members then project downwardly into the body of partially frozen ice cream a, with which the refrigerating container 1 has been previously filled. In order that all of the handles 7 may project into the container a uniform distance, a suitable gauge member such as the bar 8 may be successively applied to the upper ends of the handles 7 of each row. The gauge bar 8 is shown as provided with depending feet or members 9 which engage the top of the cover 4 when all of the handles in the row have been forced downwardly the proper distance into the container. This gauge bar can be successively applied to the several rows of handles 7 with great speed. The operator merely presses downwardly upon the upper ends of the handles with the gauge bar and forces all of the handles downwardly until the stop members 9 engage the top of the cover 4. This is repeated for each row of the handles and all of the handles then project upwardly from the cover for a uniform distance. While the handles are held in this position the receptacle 1 is placed in a refrigerating chamber, as previously mentioned, and permitted to remain in the said chamber until the freezing process has been completed and the previously soft ice cream has been solidified and hardened.

The finally hardened block of ice cream is removed from the container 1, this being readily accomplished in the usual manner by applying hot water to the exterior of the container and permitting the block of ice cream to drop therefrom. This is facilitated in the present device by the provision of the opening 2 in the bottom of the container which permits air to enter the container as the block of frozen ice cream drops out of position. The container is inverted to discharge the block of ice cream and the latter is now supported upon the projecting ends of the handles 7, as indicated by Figure 3. A support 10 is placed under the handles so that the block of ice cream can be moved and placed in the refrigerating chamber for a short period of time to chill and harden the surface thereof, which was slightly softened, due to the heating of the container when removing the same.

As indicated in a diagrammatic manner by Figure 4, the large composite block of ice cream which has thus been formed is now cut or severed into a number of small individual blocks A, each of which is provided with one of the handles 7. The size of these individual blocks A is determined by the spacing of the openings 6 in the cover 4, as will be readily apparent.

The individual portions or blocks A are now preferably provided with an outer protective covering which is formed of an edible substance of such a character that it is comparatively hard and non-sticky at normal temperatures, thereby enabling the confection to be wrapped and handled and eaten in the same manner as other candies and confections. For this purpose the individual blocks A may be dipped into a body 11 of melted chocolate, edible glycerin, cream or the like, as indicated diagrammatically by Figure 5. The usual milk chocolate coating which is used for dipping candies has been found to give good results. If the confection is merely dipped into clear cream or some like substance, a coating of granulated material 12 may be applied to the outer surface thereof, as indicated by Figure 6. The dipping of the confection into cream, gelatin or the like, is merely for the purpose of causing the granules 12 to adhere initially to the confection until the confection can be subsequently chilled and the granules firmly and permanently attached thereto by congelation. This can also be accomplished, although perhaps not quite so readily, by softening the surface of the confections so that the granules will initially stick thereto. The granules 12 may be formed of particles of chocolate, candy, nuts, a mixture of candy and nuts, or of any other edible substance with which it is desired to flavor the confection and which is non-sticky at normal temperatures.

The confections are held by means of the handles 7 while being dipped or otherwise treated to apply the protective outer covering thereto, and they are then placed upon a drying rack 13 such as that illustrated by Figure 7. This drying rack is in the form of a base member which is provided in the upper surface thereof with a plurality of recesses or pockets 14, said pockets being of a proper size and configuration to receive the extremities of the handles 7, and being spaced apart so that the confections are amply separated and there is no danger of the confections coming into contact with or rubbing against each other. While supported by the drying rack the confections are again placed in the refrigerating chamber for a few minutes, or just long enough to chill and harden the protective and flavoring outer covering which has been applied thereto. If desired, suitable wrappers may then be applied to the confections, and I have found that an attractive package is provided by slipping thin waxed or glazed paper envelopes 15 over the same, as indicated by Fig. 7. The confections are thus protected and the edible portions thereof are never touched by the human hand during the process of manufacture, or while being handled by the dealer, or while being eaten by the ultimate consumer. The confections can be eaten without difficulty while being held in the hand by means of the stick, and there is no need to use a dish or a spoon. While the confections would ordinarily be formed with an ice cream body portion, it will be obvious that any other edible substance having similar properties, such as sherbets, ices, or the like, could be readily substituted for the ice cream.

While I have illustrated and described one particular form of apparatus for carrying out the invention, it will be obvious that many modifications and changes can be made without departing from the spirit of the invention and all within the scope of the claims.

Having thus described my invention, what I claim as new and desire to secure by Letters Patent is:

1. A device for making frozen confections, including an open ended container with closed bottom and sides and adapted to receive a mass of an edible substance which is soft or liquid at normal temperatures, and a cover member fitted over the open end of the container and provided with means for positioning and supporting a handle member in engagement with the liquid edible substance and maintaining it in such position while the latter is subjected to refrigeration and frozen into a substantially solid body.

2. A device for making frozen confections, including an open ended container having closed bottom and sides and adapted to receive a mass of an edible substance which is in a soft or liquid condition at normal temperatures, a cover for the open end of the receptacle, said cover being provided with an opening to receive a handle member and support it in contact with the edible substance while the latter is subjected to refrigeration and frozen into a substantially solid body, and positioning means for holding the cover accurately in position on the container.

3. A device for making frozen confections, including an open ended container having closed bottom and side walls, and adapted to receive a mass of an edible substance which is soft or liquid at normal temperatures, a cover fitted upon the open end of the container and formed with an opening adapted to receive and frictionally engage a handle member to support the handle member in engagement with the edible substance while the latter is subjected to refrigeration and frozen into a substantially solid body, and means for positioning the cover member upon the open end of the container.

4. A device for making frozen confections, including an open ended container having closed bottom and side walls and adapted to receive a unitary mass of an edible substance which is in a soft or liquid condition at normal temperatures, a cover for the container which is provided with a plurality of openings adapted to receive handle members and support them in engagement with the edible substance while the latter is subjected to refrigeration and frozen into a substantially solid body, said openings being arranged in rows, and a gauge bar adapted to be successively applied to the handles of the different rows to force all of the handles a uniform distance into the container.

5. A device for making frozen confections, including an open ended container having closed bottom and side walls and adapted to receive a unitary mass of an edible substance which is in a soft or liquid condition at normal temperatures, a cover member fitted upon the open end of the container and formed with a plurality of openings adapted to receive handle members and support them in engagement with the edible substance while the latter is subjected to refrigeration and frozen into a solid body, the openings being arranged in rows, positioning means for holding the cover member in proper position upon the container, and a removable gauge bar adapted to be successively applied to the handle members of each row to force all of the handle members a uniform distance into the container.

In testimony whereof I affix my signature.

HARRY B. BURT.